United States Patent
Isomura et al.

(10) Patent No.: US 7,676,162 B2
(45) Date of Patent: *Mar. 9, 2010

(54) PHASE MONITOR USED IN OPTICAL RECEIVER

(75) Inventors: Akihiko Isomura, Kawasaki (JP); Jens C. Rasmussen, Kawasaki (JP); Zhenning Tao, Beijing (CN); Noriaki Mizuguchi, Kawasaki (JP); Kenichi Kaburagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 589 days.

This patent is subject to a terminal disclaimer.

(21) Appl. No.: 11/605,370

(22) Filed: Nov. 29, 2006

(65) Prior Publication Data

US 2008/0056733 A1  Mar. 6, 2008

(30) Foreign Application Priority Data

Aug. 30, 2006  (JP) .............................. 2006-234563

(51) Int. Cl.
*H04B 10/06* (2006.01)
*H04B 10/12* (2006.01)

(52) U.S. Cl. ........................ 398/212; 398/202; 398/207; 398/208; 398/209; 398/213; 398/214; 398/162; 398/206; 398/183; 398/188

(58) Field of Classification Search ................ 398/202, 398/207, 208, 209, 212, 213, 214, 162, 206, 398/183, 188; 359/279, 325

See application file for complete search history.

(56) References Cited

U.S. PATENT DOCUMENTS

| 7,433,604 B1* | 10/2008 | Kim et al. .................. 398/188 |
| 2007/0201879 A1* | 8/2007 | Liu ............................ 398/188 |
| 2009/0034967 A1* | 2/2009 | Tao et al. ...................... 398/33 |

OTHER PUBLICATIONS

Cheolhwan Kim et al., "Direct-detection optical differential 8-level phse-shift keying (OD8PSK) for spectrally efficient transmission," OTICS Express, vol. 12, No. 15; Jul. 26, 2004; pp. 3415-3421.
Murat Serbay et al., "Experimental Investigation of RZ-8DPSK at 3× 10.7Gb/s,"IEEE; 2005; pp. 483-484.
Yan Han et al., "Sensitivity Limits and Degradations in OD8PSK," IEEE Photonics Technology Letters, vol. 17, No. 3; Mar. 2005; pp. 720-722.

* cited by examiner

*Primary Examiner*—Ken N Vanderpuye
*Assistant Examiner*—Daniel G Dobson (57) ABSTRACT

Branches are grouped into a group 1 including first and second branches, and a group 2 including third and fourth branches. The signal after being passed through a dual pin photodiode in one branch included in the group 1 and being at the earlier stage of a CDR circuit is obtained. Also, from the later stage of the CDR circuit in the other branch in the group 1 is obtained. The obtained signals are passed through low pass filters, and an average value over a plurality of symbols is obtained. The signal from the earlier stage of the CDR circuit is multiplied by the signal from the later stage, and they are averaged. The obtained value reflects the phase difference of the two delay interferometers in the group 1. The group 2 is monitored by using the same method.

9 Claims, 12 Drawing Sheets

| (a,c) | VALUE OF X |
|---|---|
| (0,1) | 1 |
| (0,0) | 0.5 |
| (1,0) | −0.5 |
| (1,1) | −1 |

F I G. 1 1 B

| (b,c) | VALUE OF Y |
|---|---|
| (0,0) | 1 |
| (0,1) | 0.5 |
| (1,1) | −0.5 |
| (1,0) | −1 |

F I G. 1 1 C

F I G. 1 2 A

F I G. 1 2 B

F I G. 1 2 C

F I G. 1 2 D

F I G. 1 2 E

PHASE MONITOR USED IN OPTICAL RECEIVER

BACKGROUND OF THE INVENTION

1. Field of the Invention

The present invention relates to a Differential Eight-value Phase Shift Keying (D8PSK) optical receiver, and particularly to a phase monitor to be used in a D8PSK optical receiver, and to a phase controlling method using the same.

2. Description of the Related Art

When the D8PSK method is employed, accurate setting of optical phase differences among arms of interferometers in a receiver is important. When the setting of the optical phase differences is not accurate, optical waveforms deteriorate beyond the tolerance. In order to obtain the accurate optical phase differences, a feedback control is performed generally. By the feedback control, phase adjustment signals are created for adjusting phases in a receiver by monitoring phase errors in the receiver such that the phase remains having the target value. In the dithering control which is a typical method of feedback, penalties are caused because the phase error is caused at the optimum point. And, the amount of penalties caused by the phase error in the D8PSK method is twice that in the DQPSK or more.

Figure 1:
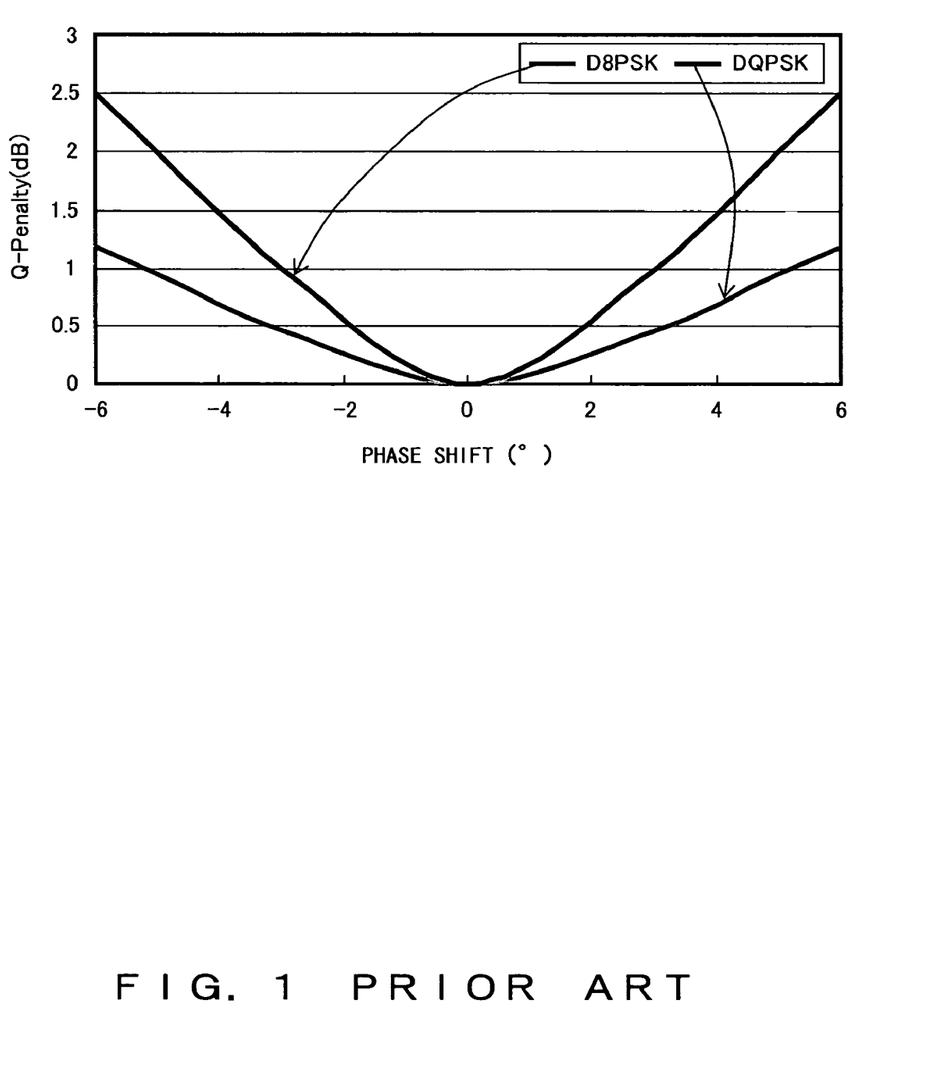
FIG. 1 shows a relationship between phase shifts of interferometers in a receiver and the Q-penalty in the cases of the D8PSK method and the DQPSK method.

FIG. 1 shows the relationship between the phase shift of interferometers in a receiver and the Q-penalty in the cases of the D8PSK method and the DQPSK method respectively.

When the phase shift is zero, the Q-penalty is zero in both of the methods. However, with increased phase shift, the amount of the Q-penalties in the D8PSK increases twice faster than that in the DQPSK or more.

One example of control methods in the dithering control is explained here. In the dithering control, in order to determine whether or not the current phase is at the optimum point, the phase of the interferometers is slightly shifted. If the waveform deteriorates (if BER (Bit Error Rate) increases) with the above slightly shifted phase more than that with the original phase, it is determined that the original phase is closer to the optimum point. If the BER decreases with the slightly shifted phase, it is determined that the shifted phase is closer to the optimum point. The example of this is shown in the graph of the D8PSK in FIG. 1, in which even when a phase is at the optimum point (when phase is not shifted), the waveform deteriorates approximately by 0.2 dB due to the dithering control if the phase is shifted by 1 degrees by the dithering control being performed once.

Additionally, in the D8PSK, it is necessary to set to different phase states four interferometers for demodulation in order to demodulate all the signals.

Non-Patent Document 1 discloses a fundamental technique of the D8PSK. Non-Patent Document 2 discloses a technique in which the OSNR and the dispersion tolerance necessary for D8PSK systems are experimentally obtained. Non-Patent Document 3 discloses a technique in which parameters important to design of receivers and transmitters in the D8PSK are calculated.

Non-Patent Document 1

Kim et al., "Direct-detection optical differential 8-level phase-shift keying (OD8PSK) for spectrally efficient transmission", OPTICS EXPRESS Vol. 12, No. 15, 26 Jul. 2004

Non-Patent Document 2

Serbay et al., "Experimental Investigation of RZ-8DPSK at 3×10.7 Gb/s", 2005 IEEE WE3 9:00-9:15, p. 483-p. 484

Non-Patent Document 3

Han et al, "Sensitivity Limits and Degradations in OD8PSK", IEEE PHOTONICS TECHNOLOGY LETTERS, VOL. 17, NO. 3, MARCH 2005, p. 720-p. 722

Because optical communication systems employing the D8PSK method have been introduced just in recent years, many methods of controlling transmitters or receivers therefor are not suggested.

SUMMARY OF THE INVENTION

It is an object of the present invention to provide a phase monitor that can adjust, as a simplex device, phases in delay interferometers, and can determine not only magnitude and sign of phases, but also whether phases of delay interferometers are set to desired values without causing waveform deteriorations due to the dithering control.

A phase monitor according to the present invention is a phase monitor for monitoring a phase error in a delay interferometer in a branch in a D8PSK optical receiver including first through fourth branches each of which includes a delay interferometer, a balanced optical detector and a data recovery circuit for the delay interferometer, comprising:

multiplier means for multiplying a signal obtained from an earlier stage of the data recovery circuit of one of the branches in a pair by a signal obtained from a later stage of the data recovery circuit of the other one of the branches; and an averaging circuit for averaging signals output from the multiplier means.

According to the present invention, it is possible to adjust phases without causing waveform deteriorations of optical signals because the interferometers are adjusted without performing the dithering control. Also, it is possible to accurately determine not only magnitude, sign of phases, but also whether or not phases in delay interferometers are set to desired values.

DESCRIPTION OF THE PREFERRED EMBODIMENTS

Figure 2:
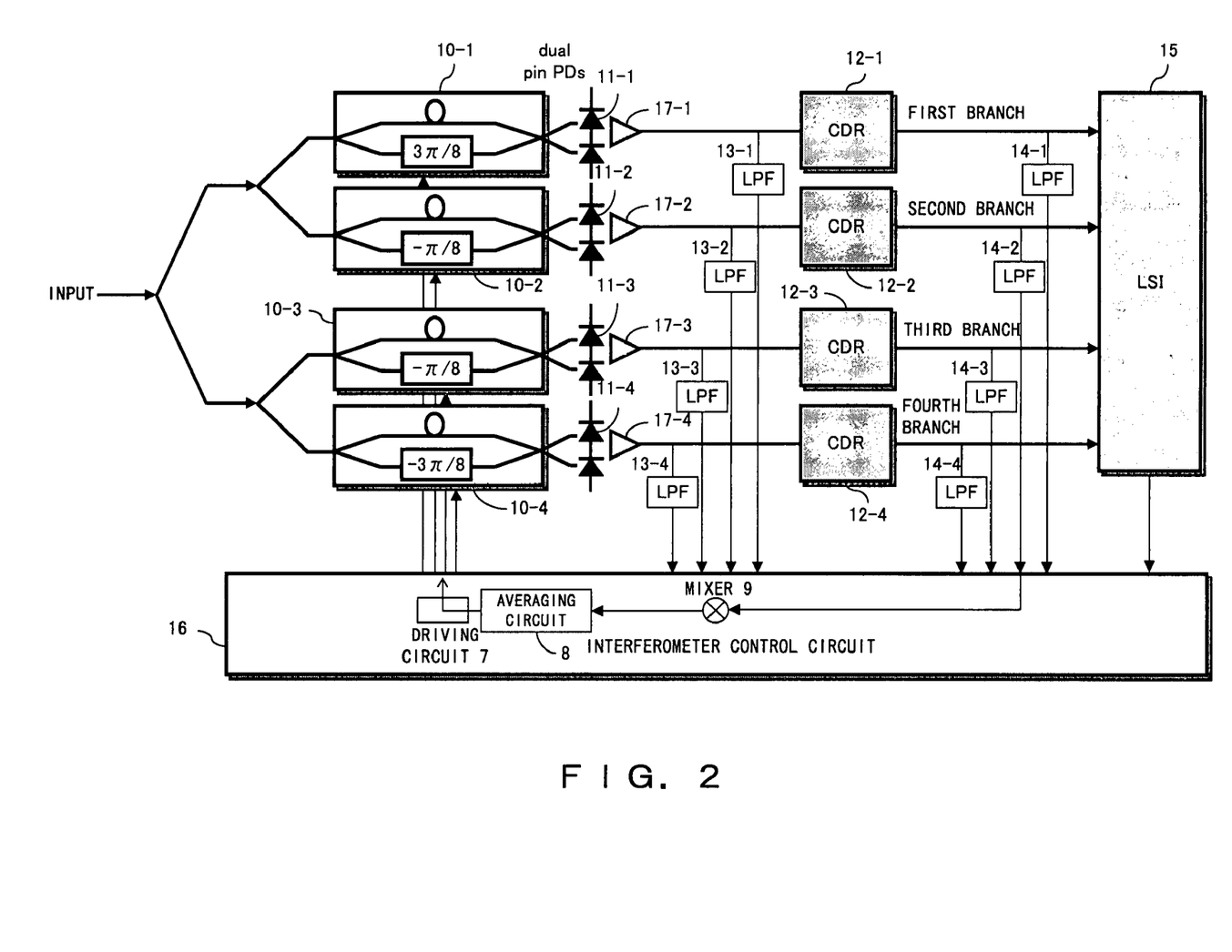
FIG. 2 is a block diagram of a phase monitor according to the first embodiment of the present invention.

FIG. 2 is a block diagram of a phase monitor according to the first embodiment of the present invention.

The input D8PSK optical signal is branched into two, and the branched signals are input to delay interferometers 10-1 through 10-4. The phase amounts in the delay interferometers 10-1 through 10-4 are respectively $3\pi/8$, $-\pi/8$, $\pi/8$, and $-3\pi/8$ as shown in FIG. 2. The optical signals output from the delay interferometers 10-1 through 10-4 are converted into the electrical signals in dual pin photodiodes 11-1 through 11-4. The signals that have been converted into the electric signals are amplified in amplifiers 17-1 through 17-4, are recovered in CDR (Clock Data Recovery) devices 12-1 through 12-4, and are subjected to signal processes in a LSI 15. An interferometer control circuit 16, on reception of data such as data error rate and the like from the LSI 15, adjusts phase amounts in the delay interferometers 10-1 through 10-4.

In the optical D8PSK receiver having first through fourth branches respectively having the CDR circuits 12-1 through 12-4 according to the present embodiment, the first and the second branches are assumed to be in a pair, and the third and the fourth branches are assumed to be in another pair. In order to monitor the phase difference in one branch included in one pair, a signal obtained by causing the signal obtained at the earlier stage of the CDR circuit of the one branch to pass through one of low pass filters 13-1 through 13-4, and a signal obtained by causing the signal obtained at the later stage of the CDR circuit of the other branch to pass through one of low pass filters 14-1 through 14-4 are input to a mixer 9 in the interferometer control circuit 16. As an example of this operation, in the interferometer control circuit 16, the signal obtained at the earlier stage of the CDR circuit 12-1 of the first branch and the signal obtained at the later stage of the CDR circuit 12-2 of the second branch are multiplied in the mixer 9, and the output signal from the mixer 9 is averaged in an averaging circuit 8, and the averaged value is fed to a driving circuit 7 for the delay interferometers 10-1 through 10-4.

The low pass filters 13-1 through 13-4 remove high frequency components in a prescribed symbol period from the analog electric signals output from the dual pin photodiodes 11-1 through 11-4. The electric signals obtained from the dual pin photodiodes 11-1 through 11-4 are signals representing "+1" or "−1" as analog values. The signals being transmitted is the signals obtained by scrambling data signal, accordingly signals of "+1" and of "−1" are transmitted at random. Accordingly, by removing the high frequency components by using the low pass filters 13-1 through 13-4, it is possible to recognize which value is transmitted more frequently between the value of "+1" and the value of "−1" in a prescribed symbol period on the basis of the outputs from the low pass filters 13-1 through 13-4. The signals obtained at the later stages of the CDR circuits 12-1 through 12-4 are signals obtained by removing the high frequency components in a prescribed symbol period from the signals converted from analog into digital. These signals also indicate which value is transmitted more frequently between the value of "+1" and the value of "−1 and how much the difference is". However, at the later stage of the CDR circuits 12-1 through 12-4, the signals have been converted into digital, thus the outputs from the low pass filters 14-1 through 14-4 are one of "+1" and "−1". By contrast, the outputs from the low pass filters 13-1 through 13-4 are the signals obtained by removing the high frequency components from analog signals, accordingly, these signals do not have definite values such as "+1" or "−1", and slight variation is caused depending on the magnitude of the phase shift in the delay interferometers 10-1 through 10-4. Therefore, it is possible to detect the variation of low frequency components in the analog signals output from the low pass filters 13-1 through 13-4 by multiplying the outputs from the low pass filters 13-1 through 13-4 by the outputs from the low pass filters 14-1 through 14-4, and averaging the obtained values on the basis of the low frequency components of the digital signals from the low pass filters 14-1 through 14-4 as reference values. As an example of this operation, by multiplying the signals at the earlier stage of the CDR circuit 12-1 of the first branch by the signals at the later stage of the CDR circuit 12-2 of the second branch and by averaging the obtained values, the monitored value approximately of zero is obtained when the amount of phase in the delay interferometer 10-1 is properly set because the signals being transmitted are scrambled. By contrast, when the amount of phase in the delay interferometer 10-1 is not properly set, the monitored value after the averaging operation has an absolute value with positive or negative sign, that is not zero. Accordingly, by adjusting the amount of phase in the delay interferometer 10-1 such that the monitored value after the averaging operation is zero, the amount of phase in the delay interferometer 10-1 can be set properly. For the delay interferometer 10-2, it is possible to appropriately set the amount of phase through a control of the amount of phase in the same method on the basis of the monitored value obtained by multiplying the low frequency components of the signals obtained at the earlier stage of the CDR circuit 12-2 by the low frequency components of the signal obtained at the later stage of the CDR circuit 12-1 and by averaging the obtained values. Also for the third branch and the fourth branch, by the same control as that for the first and second branches being performed independently, the amounts of phase can be controlled. However, only by the above operations, it is probable that the first and second branches and the third and fourth branches have the same amount of phase.

Figure 3A:
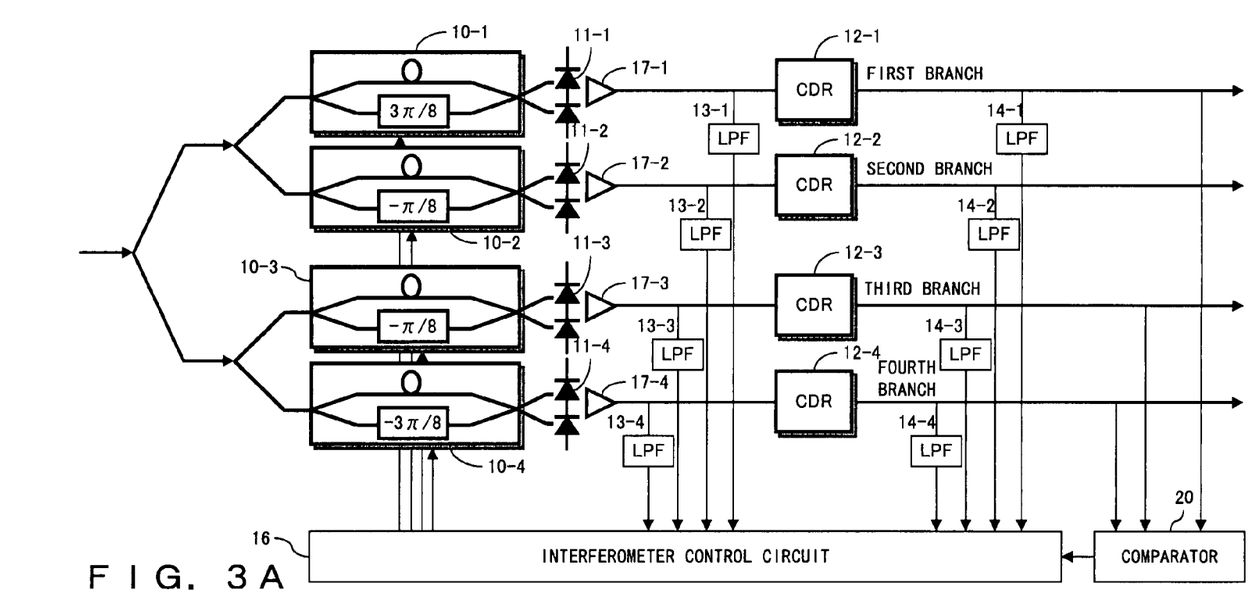
FIGS. 3A and 3B are block diagrams showing a phase monitor according to the second embodiment of the present invention.
Figure 3B:
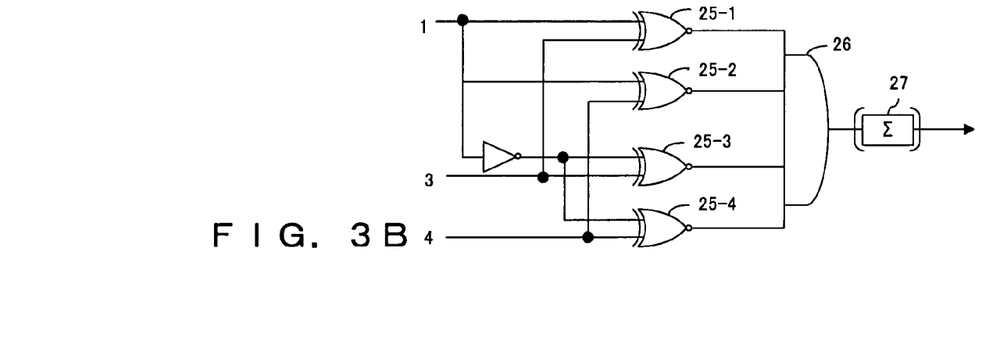

FIG. 3A and FIG. 3B are block diagrams showing a phase monitor according to the second embodiment of the present invention.

In FIG. 3A and FIG. 3B, like constituent components as those in FIG. 2 are denoted by like numerals, and the explanations thereof are omitted.

In the present embodiment, as shown in FIG. 3A, signals are obtained at the later stages of the respective CDR circuits 12-1 through 12-4, and the obtained signals are compared in a comparator 20, then the comparison result is input to the interferometer control circuit 16. On reception of this comparison result, the interferometer control circuit 16 controls the amounts of phase in the delay interferometers 10-1 through 10-4. FIG. 3B shows a configuration example of the comparator 20.

In FIG. 3B, the result of the EXOR operation between the signals from the first and third branches, the result of the EXOR operation between the signals from the first and fourth branches are obtained by using EXOR circuits 25-1 and 25-2, and the result of the EXOR operation between the inverted signal of the signal from the first branch and the signal from the third branch, and the result of the EXOR operation between the inverted signal of the signal from the first branch and the signal from the fourth branch are obtained by using EXOR circuits 25-3 and 25-4. Then, the result of the AND operation between the above obtained results are obtained by using an AND circuit 26. It is not always necessary to provide an averaging device 27. This circuit is for determining whether or not the amount of phase in the delay interferometer of the first branch is the same as the amounts of phase respectively in the delay interferometers of the third and fourth branches, and also for determining whether or not the amount of phase in the delay interferometer of the first branch is shifted by 180 degrees respectively from those in the delay interferometers of the third and fourth branches. When the two delay interferometers have the same amount of phase, it is recognized that the two delay interferometers have received the same signal, and these interferometers are detected. When the amounts of phase are different by 180 degrees between the two delay interferometers, one delay interferometer outputs a signal and the other delay interferometer outputs the inverted signal of the signal of the one delay interferometer, and these outputs are detected. When the signals of the first branch and the third branch are different, the EXOR circuit 25-1 outputs "1". Similarly, when the signals of the first branch and the fourth branch are different, the EXOR circuit 25-2 outputs "1". The EXOR circuit 25-3 outputs "1" when the signals of the first branch and the third branch are different. The EXOR circuit 25-4 outputs "1" when the inverted signal of the signal of the first branch and the signal of the fourth branch are different. The result of the AND operation of these outputs of the EXOR circuits 25-1 through 25-4 is obtained by using the AND circuit 26. When the obtained value is zero, it is recognized that one of the above combinations has the same value, and that one of the EXOR circuits 25-1 through 25-4 outputs zero. Accordingly, the phases of the third and fourth branches are shifted.

In order to avoid shifting the phase too much by a small error, the averaging device 27 is provided such that the outputs of the AND circuit 26 in the prescribed period are averaged, and the phases of the third and fourth branches are shifted when the averaged value is continuously zero.

FIG. 4A, FIG. 4B, FIG. 5A, and FIG. 5B respectively show variation examples of the configuration shown in FIG. 3B.

Figure 4A:
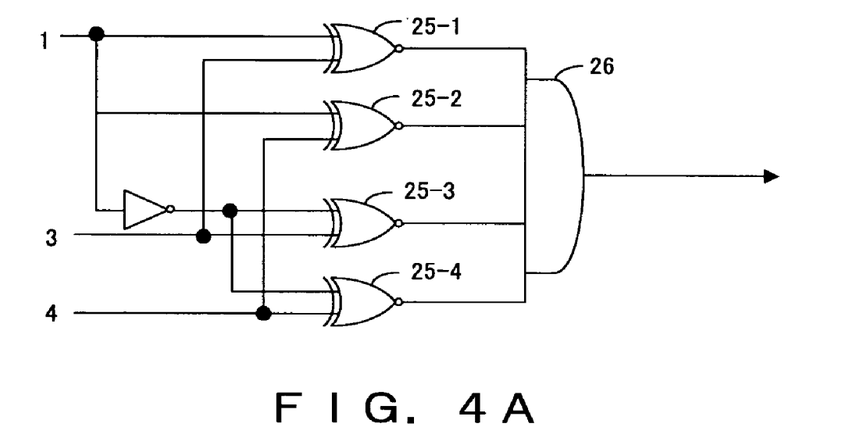
FIGS. 4A and 4B show first variation example of the configuration shown in FIG. 3B.

In the configuration shown in FIG. 4A, the interferometer control circuit can control, as a simplex device, the interferometers such that they are in different phase states. In FIG. 4A, a part of signals is tapped at the later stage of a recovery circuit. The tapped signal of the first branch or the logically inverted signal is compared with the signals of the third and fourth branches. When the signal of the first branch or the logically inverted signal component is continuously included in the third or fourth branch, the interferometers are in the same phase state between the first and third branches and between the second and fourth branches. In this case, by shifting the amounts of phase of the delay interferometers of third and fourth branches by $\pi/4$, it is possible to control the interferometers such that they are in different phase states without identifying signals by using an LSI having functions of terminating communication data. The logical expression of the circuit shown in FIG. 4A is as below.

(1xor 3)and(1xor4)and ($\overline{1}$ xor3)and($\overline{1}$ xor 4)

When the signal component of the first branch is included in the third or fourth branch, the output value is always zero. In this case, the phases of the interferometers of the third and fourth branches are shifted by $\pi/4$.

Figure 4B:
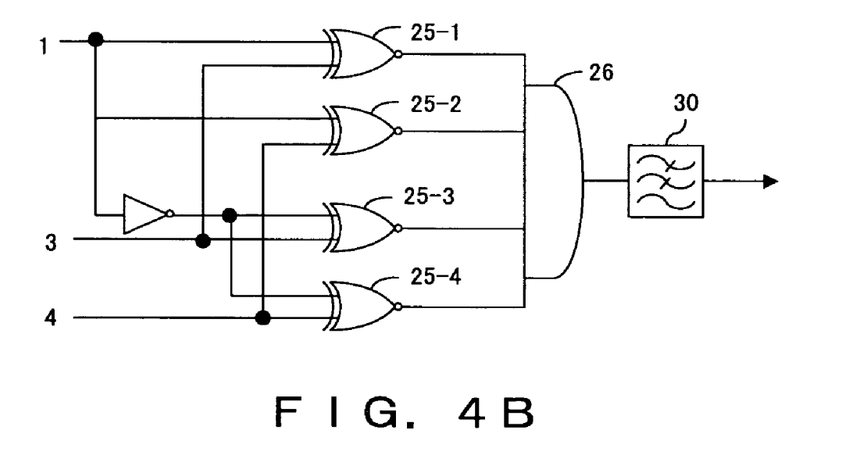

In the configuration shown in FIG. 4B, the function of calculating the average value of output signals is added to the configuration shown in FIG. 4A. As an example of devices that realize this function, a low pass filter 30 is provided. In the configuration shown in FIG. 4A, an electric circuit that operates at the same speed as the output signals is required, however, the output signals are driven at low speed, accordingly, a high speed electric circuit is not required.

Figure 5A:
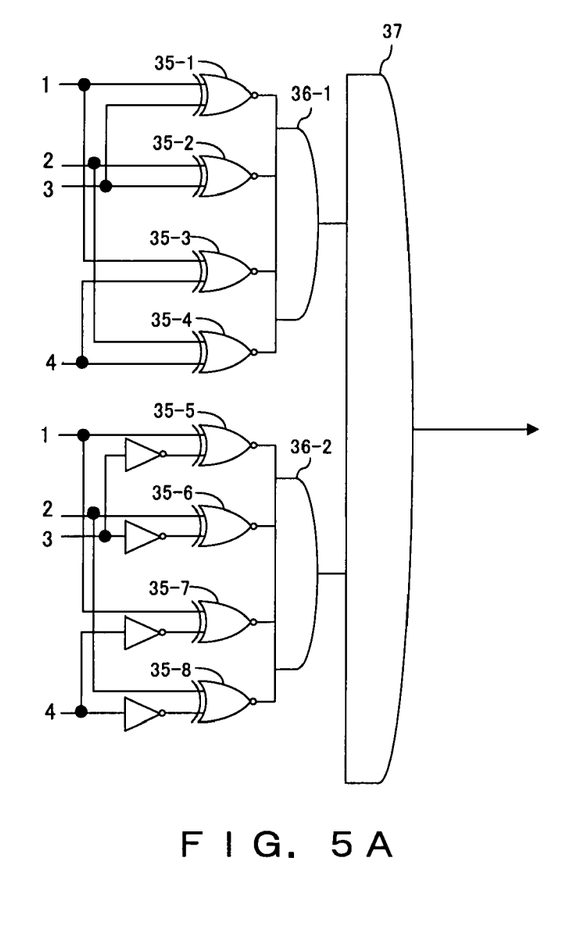
FIGS. 5A and 5B show second variation example of the configuration shown in FIG. 3B.

In the configuration of FIG. 5A, the tapped signal of the first branch and the signal of the third branch are compared in an EXOR circuit 35-1, and the tapped signal of the first branch and the signal of the fourth branch are compared in an EXOR circuit 35-3. Also, the tapped signal of the second branch and the signal of the third branch are compared in an EXOR circuit 35-2, and the tapped signal of the second branch and the signal of the fourth branch are compared in an EXOR circuit 35-4. Then, the results of the AND operations among the respective signals are obtained by using an AND circuit 36-1. Also, the tapped signal of the first branch and the logically inverted signal of the signal of the third branch are compared in an EXOR circuit 35-5, and the tapped signal of the first branch and the logically inverted signal of the signal of the fourth branch are compared in an EXOR circuit 35-7. The tapped signal of the second branch and the logically inverted signal of the signal of the third branch are compared in an EXOR circuit 35-6, and the tapped signal of the second branch and the logically inverted signal of the signal of the fourth branch are compared in an EXOR circuit 35-8. Then, the result of the AND operations among the respective signals are obtained by using an AND circuit 36-2. Further, the result of the AND operation between the two result signals from the AND circuit 36-1 and the AND circuit 36-2 is obtained by using an AND circuit 37 in order to determine the phase state of the delay interferometers. Circuits for exclusive OR operations between the signals of the first and third branches, the signals of the second and third branches, the signals of the first and fourth branches, and the signals of the second and fourth branches are provided as EXOR circuits 35-1 through 35-4 as shown in FIG. 5A. An AND operation circuit 36-1 for the output signals of the AND circuits 35-1 through 35-4 is provided. Similarly, circuits for exclusive OR operations between the signal of the first branch and the inverted signal of the signal of the third branch, the signal of the second branch and the inverted signal of the signal of the third branch, the signal of the first branch and the inverted signal of the signal of the fourth branch, and the signal of the second branch and the inverted signal of the signal of the fourth branch are provided as EXOR circuits 35-5 through 35-8. An AND operation circuit 36-2 for the output signals of the AND circuits 35-5 through 35-8 is provided. Also, an AND operation circuit 37 for the output signals of the AND circuits 36-1 and 36-2 is provided.

When the output of the AND circuit 37 is "1", all the signals of the first through fourth branches have values different from one another, which means that the state is normal. When the output of the AND circuit 37 is "0", output signals correlated with each other are included in the signals of the first through fourth branches. When the outputs of the AND circuits 36-1 and 36-2 are "0" and "0", "1" and "0", or "0" and "1" (in other words when the output of the AND circuit 37 is "0"), the interferometers of the two pairs of first and second branches and of the third and fourth branches have the same phase state, accordingly, the phase state of one of the pairs of the interferometers is shifted by $\pi/2$. When the outputs of the AND circuits 36-1 and 36-2 are "1" and "1" (in other words when the output of the AND circuit 37 is "1"), the phase relationship among the interferometers is normal, and the outputs of all the channels have the positive sign.

Figure 5B:
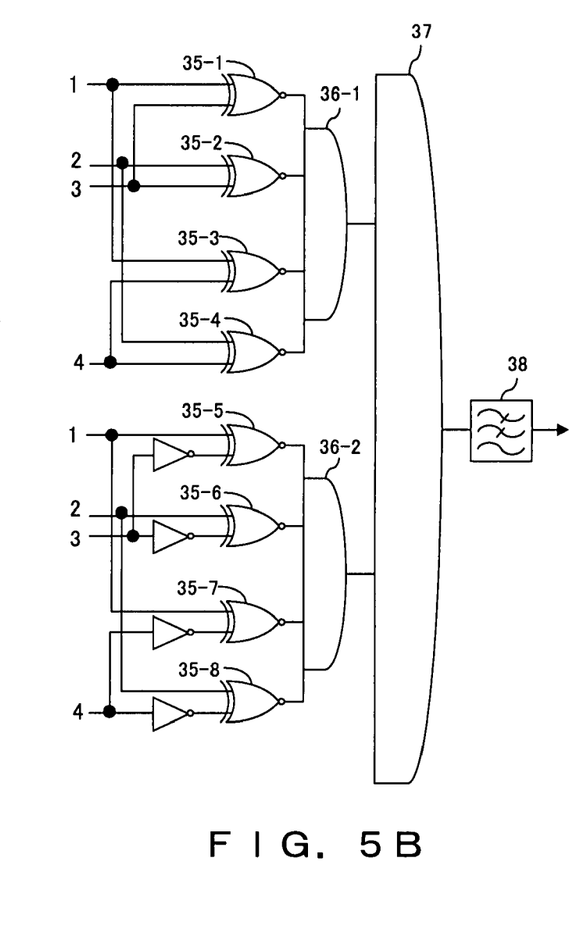

The configuration shown in FIG. 5B includes an averaging circuit 38 (such as a low pass filter of e.g., low pass filter of 100 MHz) for outputting signals, such that the output signals are signals that have been averaged over a plurality of symbols. Accordingly, the circuit can be configured using low speed electric devices even when the bit rate of optical signals is very high.

Figure 6A:
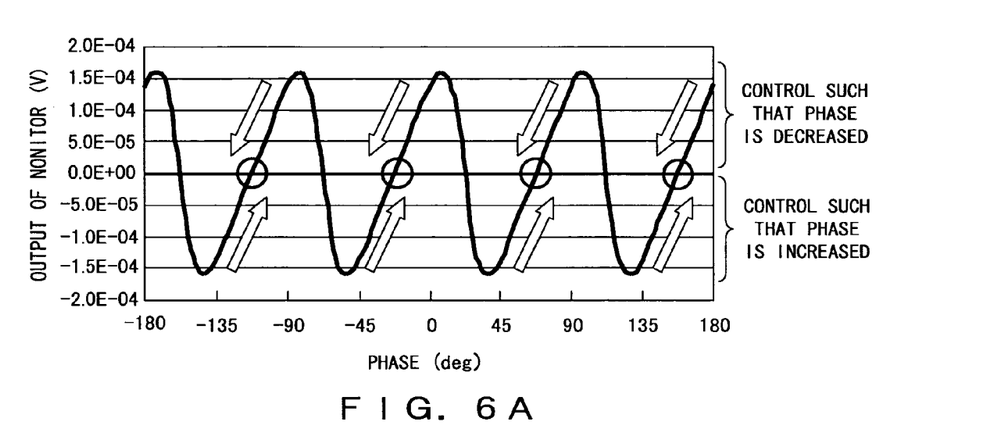
FIGS. 6A and 6B show the relationships between monitored values and phases for controlling the interferometers in the interferometer having the configuration shown in FIG. 2.
Figure 6B:
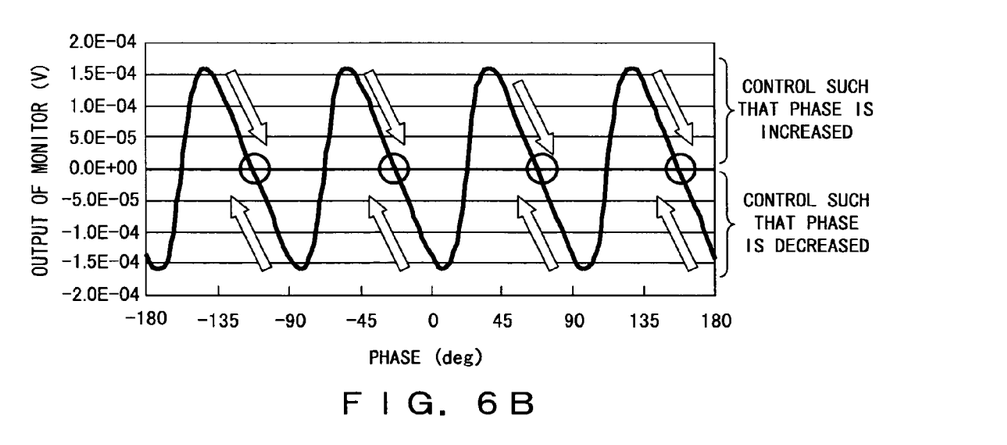

FIG. 6A and FIG. 6B, respectively show the relationships between the monitored values and the phases for controlling the interferometers in the interferometer having the configuration shown in FIG. 2.

FIG. 6A shows the relationship between the phase values and the mixer outputs (values before the monitored values are averaged) in the delay interferometer of the first or the third branch. FIG. 6B shows the relationship between the phase values and the mixer outputs in the delay interferometer of the second or the fourth branch.

When the monitored signal has the value of zero, the delay interferometers have the same optimal phase difference between the first (third) and second (fourth) branches. Accordingly, in the case when the delay interferometer of the first or third branch is controlled, the control is performed such that the phase is decreased (increased) when the monitored signal has positive values, and the phase is increased (decreased) when the monitored signal has negative values. In the case when the delay interferometer of the second or the fourth branch is controlled, the control is performed such that the phase is increased (decreased) when the monitored signal has positive values, and the phase is decreased (increased) when the monitored signal has negative values.

Figure 7:
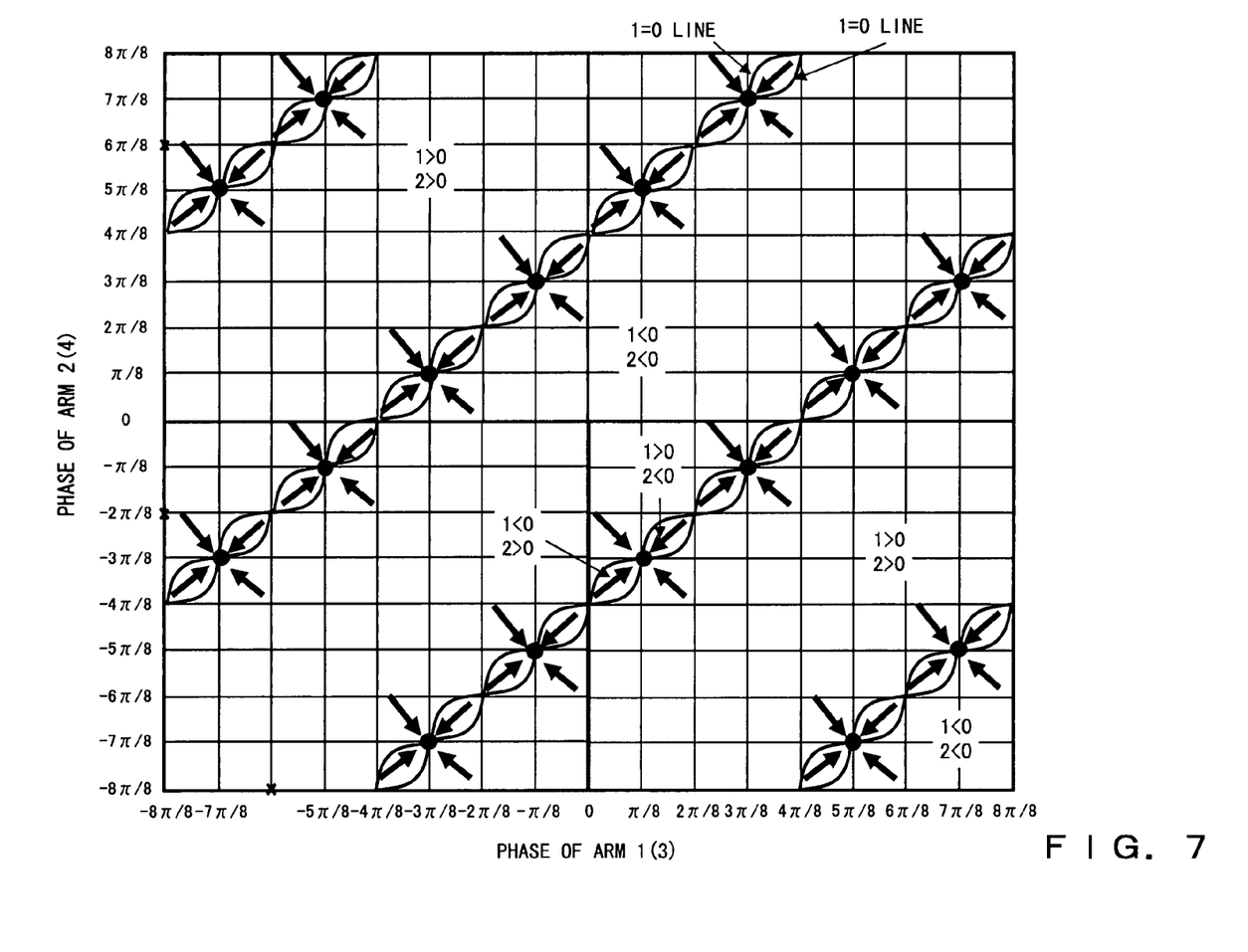
FIG. 7 shows the first example of phase control.
Figure 8A:
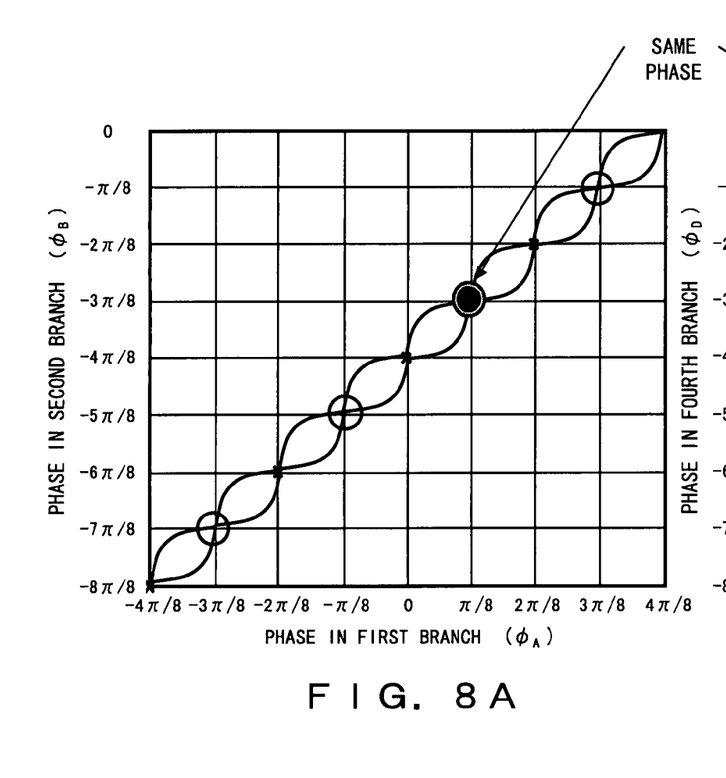
FIGS. 8A and 8B show the second example of phase control.
Figure 8B:
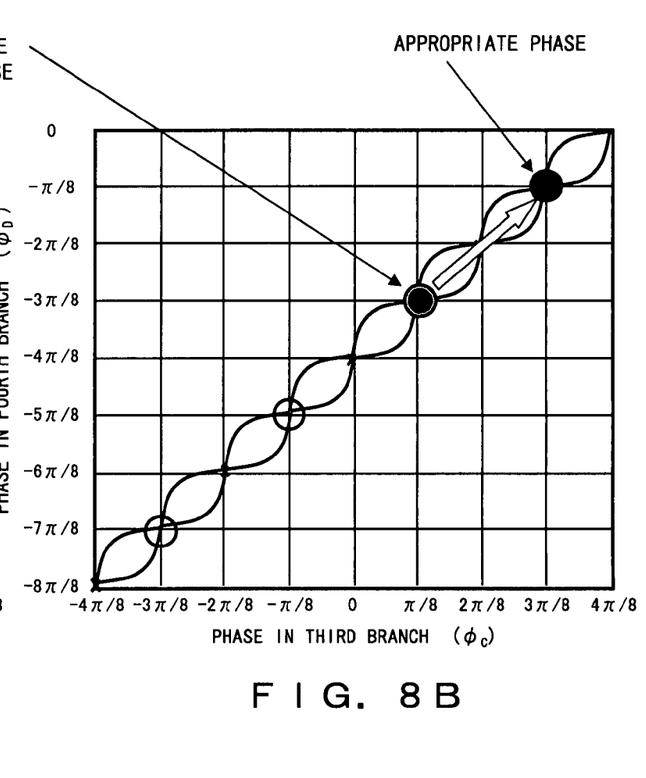

FIG. 7, FIG. 8A, and FIG. 8B explain the phase control.

In FIG. 7, the horizontal axis represents the phase in the delay interferometer of the first or third branch, and the vertical axis represents the phase in the delay interferometer of the second or fourth branch in order to show the monitored values of the first (third) and the second (fourth) branches. FIG. 8A and FIG. 8B show effects of the control performed in the configuration shown in FIG. 2.

In FIG. 7, the regions denoted by "1>0" are the regions in which the monitored values of the first branch are positive. The regions denoted by "2>0" are the regions in which the monitored values of the second branch are positive. The regions denoted by "1<0" are the regions in which the monitored values of the first branch are negative, and the regions denoted by "2<0" are the regions in which the monitored values of the second branch are negative. The lines denoted by "1=0 line" are the lines on which the monitored values of the first branch become zero. Black dots are the points at which both the first (third) branch and the second (fourth) branch become zero. When the delay interferometers are controlled such that the monitored values of the respective branches become zero, the phases in the respective delay interferometers converge to one of the optimum phase states represented by the above black dots in FIG. 7. However, it is not known to which phase state the phases converge. Therefore, it is probable that the first and third branches and the second and the fourth branches have the same phase.

It is possible to determine, on the basis of the signals in the electric circuit (an LSI having functions of terminating communication data) at the later stage of the CDR circuits, whether or not the respective delay interferometers are adjusted to have desired phases. This method can be applied to the embodiment shown in FIG. 2. When the first and the third branches, and the second and the fourth branches are in the same phase states, the same signal is obtained. In this configuration, the interferometer control circuit can not perform the control operation without the LSI having functions of terminating communication data.

However, by providing the configurations shown in FIG. 3B through FIG. 5B, the determination can be performed without the LSI having functions of terminating communication data.

FIG. 8A and FIG. 8B show the operations of the configurations shown in FIG. 3B through FIG. 5B.

When the control is performed by the configuration shown in FIG. 2, the phases of the delay interferometers are set such that the monitored values are zero. However, as shown by the black dots in FIG. 7, delay interferometers can have a several number of phase values with which the monitored value becomes zero. Accordingly, when controlling the phases of the delay interferometers, it is probable that the interferometers have the same phase between the first and the third branches and between the second and the fourth branches. These outcomes are shown in FIG. 8A and FIG. 8B. FIG. 8A shows the phase relationship between the first and the second branches. FIG. 8B shows the phase relationship between the third and the fourth branches. As shown in these figures, the interferometers can have the same phase between the first and the third branches and between the second and the fourth branches. However, the phases of the delay interferometers have to be different by $\pi/4$ between the first and the third branches and between the second and the fourth branches. Accordingly, in the above case, the phases of the delay interferometers of e.g., the third and the fourth branches are shifted by $\pi/4$ in order to attain the appropriate phase states. In other words, in FIG. 3B through FIG. 5B, determination is performed on whether or not the signals of the first and the third braches and the signals of the second and the fourth branches are the same or the latters' signals are the signals obtained by inverting the sign of the formers' signals, accordingly, by performing the above control on the basis of this determination result, it is possible to properly set the phases of the delay interferometers.

Figure 9:
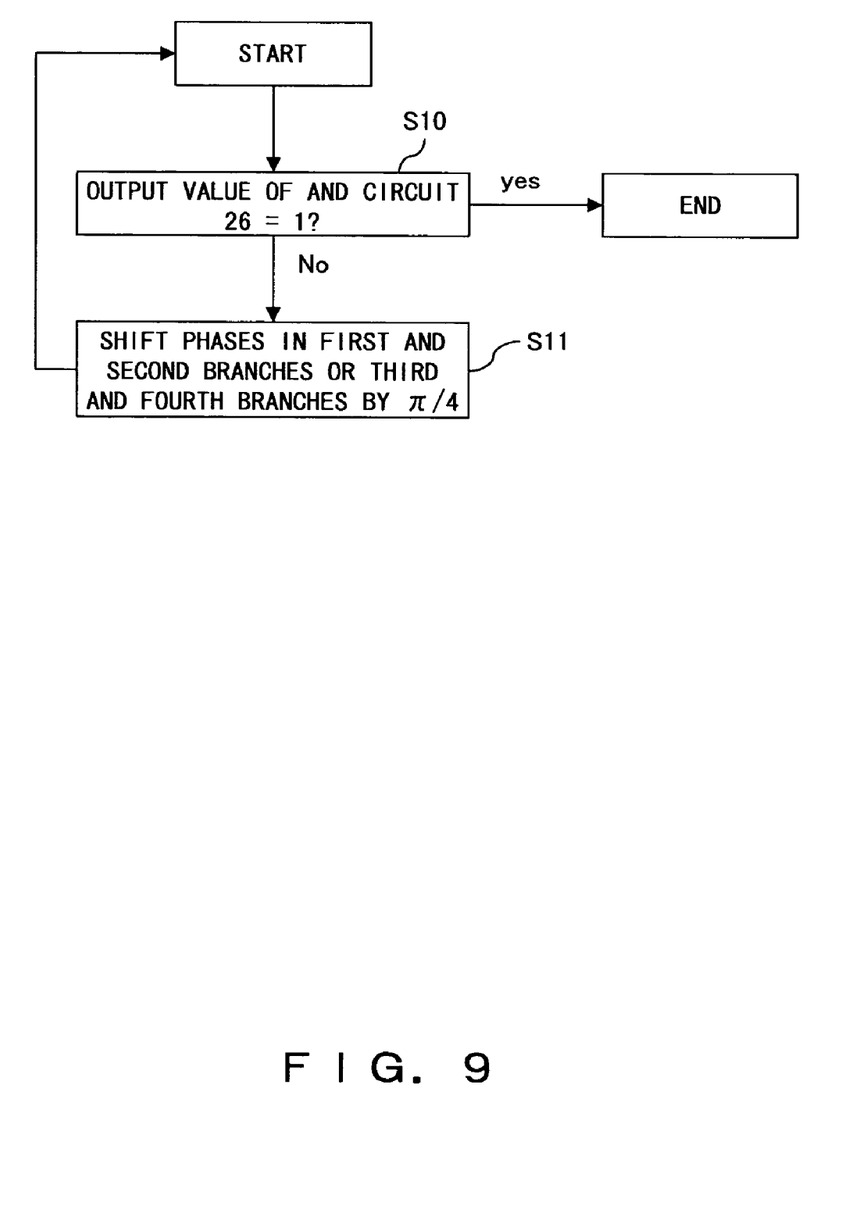
FIG. 9 is the first flowchart of the process executed in the configuration shown in FIG. 2 for adjusting the phases between the first and third branches and the second and the fourth branches.
Figure 10:
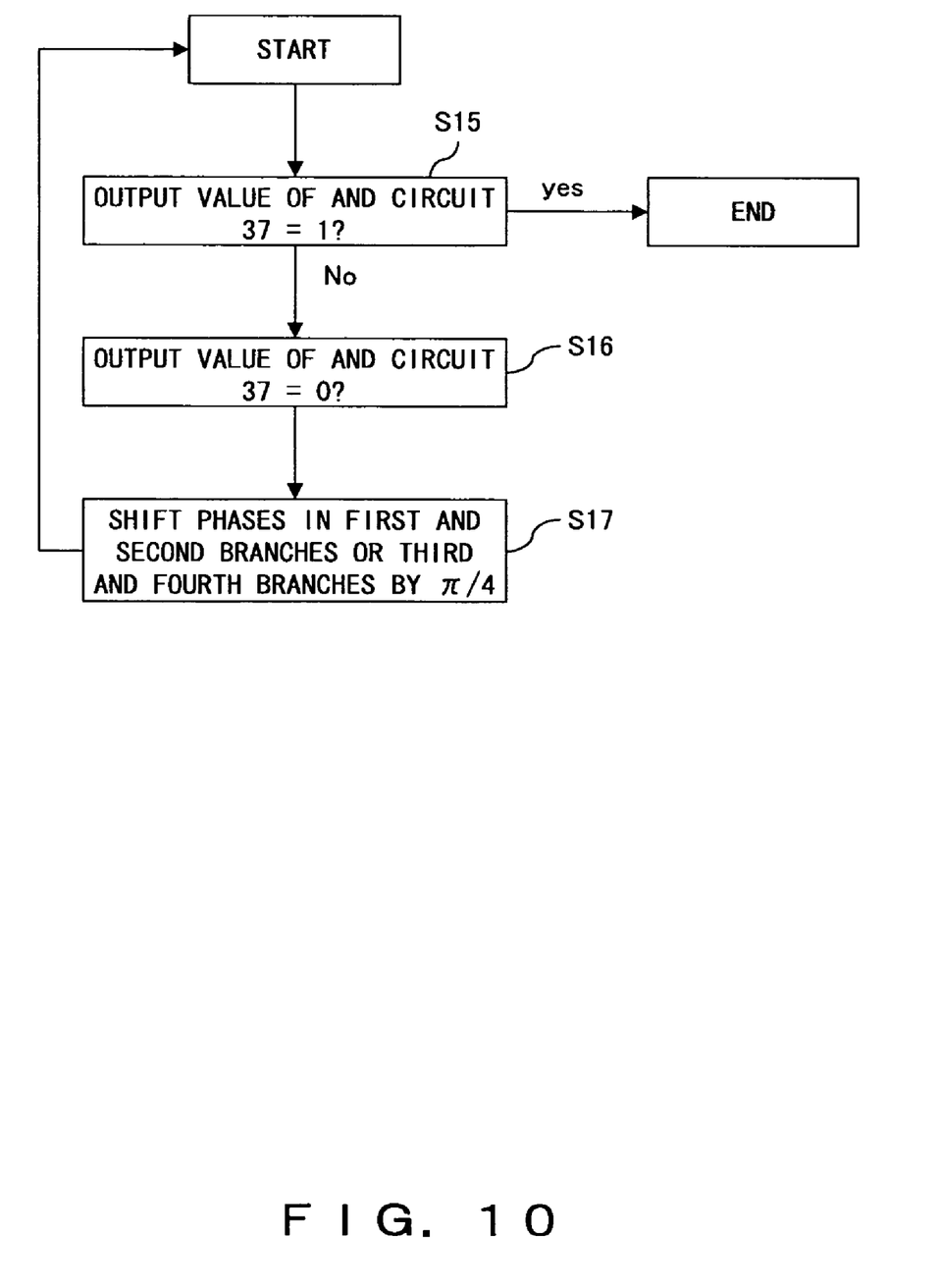
FIG. 10 is the second flowchart of the process executed in the configuration shown in FIGS. 3A and 3B for adjusting the phases between the first and third branches and the second and the fourth branches.

FIG. 9 and FIG. 10 are flowcharts of the processes executed in the configuration shown in FIGS. 3A and 3B for adjusting the phases between the first and third branches and the second and the fourth branches.

FIG. 9 shows the process executed when the comparator 20 has the configurations shown in FIG. 4A and 4B. In step S10, it is determined whether or not the output value of the AND circuit 26 is "1". When the determination result in step S10 is Yes, this process terminates. When the determination result of step S10 is No, the phases of the interferometers of the pair of the first and the second branches or the phases of the interferometers of the pair of the third and the fourth branches are shifted by $\pi/4$. The determination of which pair is to be shifted is made on the basis of which pair serves as the reference for the control. This may be appropriately determined by those skilled in the art.

FIG. 10 shows the process executed when the comparator 20 has the configuration shown in FIG. 5A and FIG. 5B. In step S15, it is determined whether or not the output value of the AND circuit 37 is "1". When the determination result of step S15 is Yes, the process terminates. When the determination result of step S15 is No, it is determined whether or not the output value of the AND circuit 37 is "0" in step S16. Then, in step S17, the phases of the interferometers of the pair of the first and the second branches or the phases of the interferometers of the pair of the third and the fourth branches are shifted by $\pi/4$. It can be appropriately determined by those skilled in the art which pair is shifted.

Hereinafter, the relationship between the monitored values and the phases applied to signals by the delay interferometers in FIG. 2 will be explained.

The signals after being passed through photo detectors of the first branch and the second branch are respectively expressed as below.

The first branch: $A(t)\cos(\Delta\phi+3\pi/8+\delta_1)$

The second branch: $A(t)\cos(\Delta\phi-\pi/8+\delta_2)$ where Δϕ represents the phase difference between two adjacent symbols, $\delta_1$ and $\delta_2$ represent the error from the optimum phase. When the first branch is controlled, the second branch is used as the reference (assuming that the phase is at the optimum point).

The multiplied signal is expressed by the equation (1) below.

$$A^2(t)\cos(\Delta\phi+3\pi/8+\delta_1)\cos(\Delta\phi-\pi/8)=A^2(t)\cos(\Delta\phi+3\pi/8+\delta_1)\sin(\Delta\phi+3\pi/8)=A^2(t)\cos(\Delta\phi+3\pi/8)\sin(\Delta\phi+3\pi/8)\cos(\delta_1)-A^2(t)\sin^2(\Delta\phi+3\pi/8)\sin(\delta_1) \quad (1)$$

where the phase difference Δϕ is evenly distributed to ±π/8, ±3π/8, 5π/8, and 7π/8. Because the transmission data is scrambled on the transmission side, the first member in the equation (1) is averaged and removed. Also, the second member in the equation (2) is "$-A^2(t) 4\times\sin(\delta_1)$" at the earlier stage of the averaging unit regardless of phase difference Δϕ. Accordingly, when "$4\times A^2(t)$" is averaged by an averaging unit 117, the result is a constant value that has no relationship with the information transmitted. Accordingly, the signals output from the averaging unit are in proportion to "$-\sin(\delta_1)$". Additionally, when the phase error is small, the signal can be approximated to "$-\delta_1$", accordingly, by monitoring signal magnitude of the signal after averaging, the phase error "$-\delta_1$" can be measured.

As described above, the phase monitor can detect not only magnitude of phase errors, but also sign of the phase errors. Also, because the derivative of the error signals with respect to the phase errors are constant, amount of change of the monitored values does not change with respect to the change in phases, and the sensitivity of the phase monitor is constant even when the phase error is zero. This phase control is possible also in the second embodiment similarly.

On the third and the fourth branches, this control is performed independently from the control on the first and the second branches. It is sufficient to guarantee that the phases in the interferometers are shifted by π/4 between the first and the third branches and between the second and the fourth branches.

FIG. 11A through FIG. 12E, explain encoding and decoding in the D8PSK method.

In the D8PSK method, the carrier waves of the zero phase (the x-axis) and the π/2 phase (the Y-axis) orthogonal to each other are synthesized. For the synthesization, four-value signals are used instead of two-value signals of positive or negative value. In the D8PSK method, three bits can be expressed by one symbol, thus the three bits are expressed by (a, b, c).

Whether base signals of the carrier waves of the zero phase are positive or negative is defined by the value of "a" i.e., by "1" or "0". The magnitude (1 or 0.5) is defined by the value of "c" i.e., by "1" or "0". Whether the base signals of the carrier waves of the π/2 phase are positive or negative defined by the value of "b" i.e., by "1" or "0". The magnitude (1 or 0.5) is defined by the value of "c" i.e., by "1" or "0". The magnitude of "c" is obtained as the opposite value of the magnitude on the X-axis.

Figure 11A:
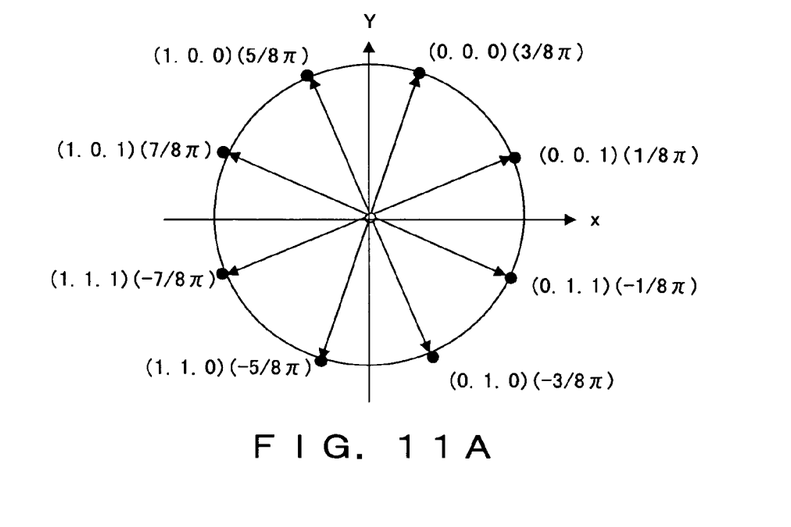
FIGS. 11A through 11C provide the first explanation of encoding and decoding in the D8PSK method.
Figure 11B:
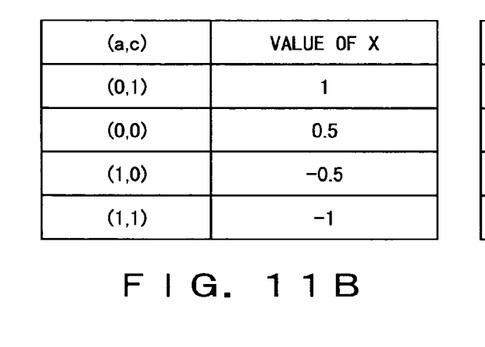
Figure 11C:
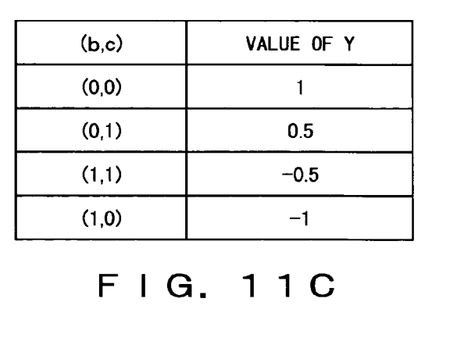

As described above, the relationships are established between the bit array shown in FIG. 11B and amplitude of the zero phase, and between the bit array shown in FIG. 11C and the amplitude of the π/2. By signal points are distributed on the X-Y plane on the basis of the above relationships, the circle is depicted as shown in FIG. 11A. On the receiving side, by receiving the signal points on this circle, the three bits are decoded.

Figure 12A:
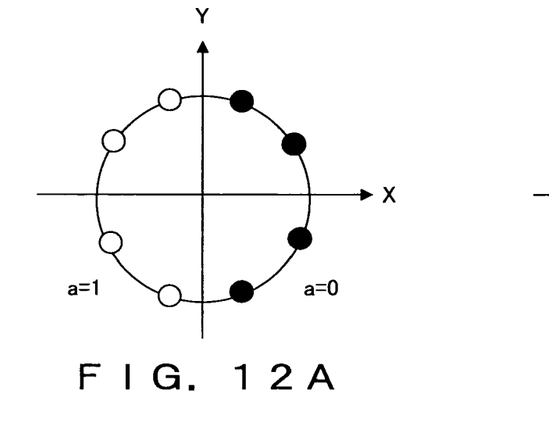
FIGS. 12A through 12E provide the second explanation of encoding and decoding in the D8PSK method.
Figure 12B:
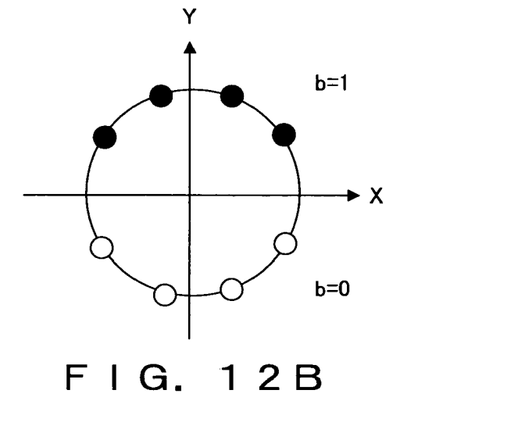
Figure 12C:
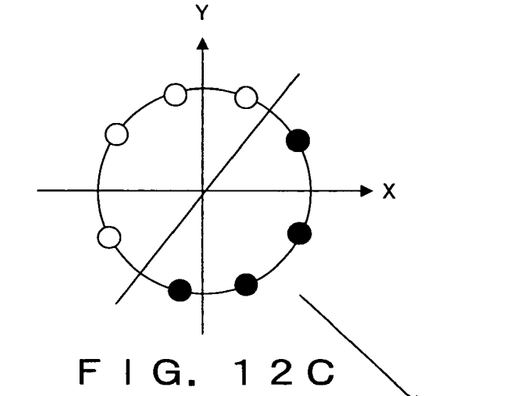
Figure 12D:
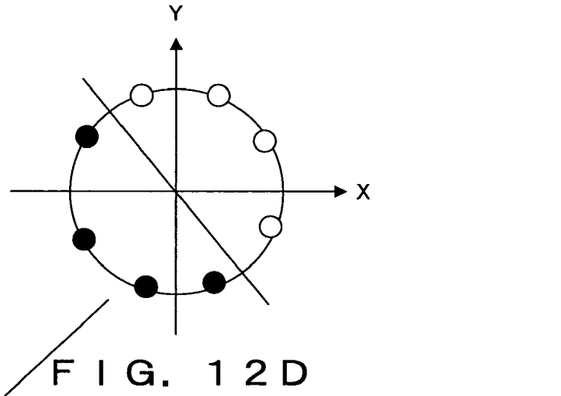
Figure 12E:
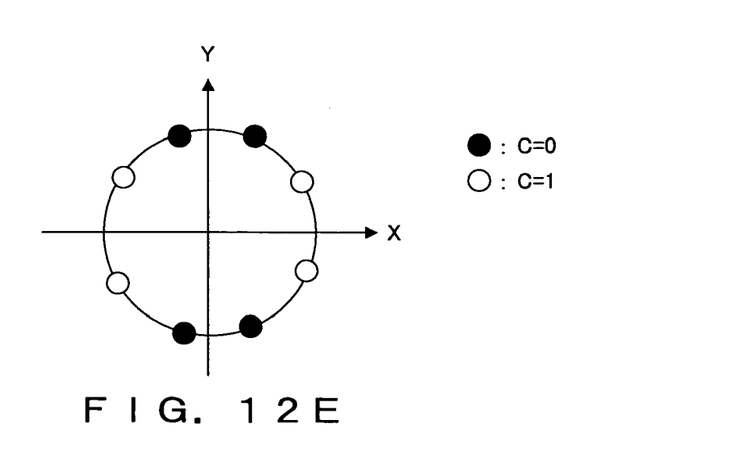

FIG. 12A through FIG. 12E show the method of the decoding. As shown in FIG. 12A, the bit "a" defines positive/negative on the X-axis, accordingly, the bit "a" is used for defining positive/negative of the received signals of the first branch. As shown in FIG. 12B, the bit "b" defines positive/negative on the Y-axis, accordingly, the bit "b" is used for defining the positive/negative of the received signals of the second branch. As shown FIG. 12C, the bit "c" determines the positive/negative on the basis of the line obtained by inclining the graph shown in FIG. 12A by 45 degrees, determines positive/negative on the basis of the line obtained by inclining the graph shown in FIG. 12C by 45 degrees to the other direction, obtains the result of the EXOR operation of the determination based on the FIG. 12C and the determination based on FIG. 12D, and defines the bit value on the basis of the relationship shown in FIG. 12E. As an example of this operation, the bit "c" is defined on the basis of the result of the EXOR operation of the determination result of the positive/negative of the third branch and the determination result of the positive/negative of the fourth branch.

What is claimed is:

1. A phase monitor for monitoring a phase error in a delay interferometer in a branch in a D8PSK optical receiver including first through fourth branches each of which includes a delay interferometer, a balanced optical detector and a data recovery circuit for the delay interferometer, comprising:
   a multiplier unit for multiplying a signal obtained from an earlier stage of the data recovery circuit of one of the branches in a pair by a signal obtained from a later stage of the data recovery circuit of the other one of the branches; and
   an averaging circuit for averaging signals output from the multiplier unit.

2. The phase monitor according to claim 1, wherein:
   the signals obtained from the earlier and later stages of the data recovery circuits are input to the multiplier unit after being passed through low pass filters.

3. A control device using the phase monitor according to claim 1, comprising:
   a control unit for controlling phases of the four delay interferometers such that output from the averaging circuit is zero.

4. The phase monitor according to claim 1, further comprising:
   a determination unit for obtaining signals from later stages of the respective data recovery circuits, and for determining whether or not signals of a first branch pair of the first and the second branches and signals of a second branch pair of the third and the fourth branches are in a relationship in which the signals in each pair are equal to each other or one signal is a signal whose sign is inverted sign of the other signal in each pair.

5. The phase monitor according to claim 4, wherein:
   the determination unit includes:
   a first exclusive OR circuit for performing an exclusive OR operation of a signal of a first branch and a signal of a third branch;
   a second exclusive OR circuit for performing an exclusive OR operation of a signal of a first branch and a signal of a fourth branch;
   a third exclusive OR circuit for performing an exclusive OR operation of a signal obtained by logically inverting a signal of a first branch and a signal of a third branch;
   a fourth exclusive OR circuit for performing an exclusive OR operation of a signal obtained by logically inverting a signal of a first branch and a signal of a fourth branch; and an AND circuit for performing an AND operation of the signals of the respective results of the exclusive OR operations.

6. The phase monitor according to claim 5, comprising:
a filter for averaging outputs of the AND circuit.

7. The phase monitor according to claim 4, wherein:
the determination unit includes:
- a first exclusive OR circuit for performing an exclusive OR operation of a signal of a first branch and a signal of a third branch;
- a second exclusive OR circuit for performing an exclusive OR operation of a signal of a first branch and a signal of a fourth branch;
- a third exclusive OR circuit for performing an exclusive OR operation of a signal of a second branch and a signal of a third branch;
- a fourth exclusive OR circuit for performing an exclusive OR operation of a signal of a second branch and a signal of a fourth branch;
- a first AND circuit for performing an AND operation of output signals of the first through fourth exclusive OR circuits;
- a fifth exclusive OR circuit for performing an exclusive OR operation of a signal of a first branch and a signal obtained by logically inverting a signal of a third branch;
- a sixth exclusive OR circuit for performing an exclusive OR operation of a signal of a first branch and a signal obtained by logically inverting a signal of a fourth branch;
- a seventh exclusive OR circuit for performing an exclusive OR operation of a signal of a second branch and a signal obtained by logically inverting a signal of a third branch;
- an eighth exclusive OR circuit for performing an exclusive OR operation of a signal of a second branch and a signal obtained by logically inverting a signal of a fourth branch;
- a second AND circuit for performing an AND operation of output signals of the fifth through eighth exclusive OR circuits; and
- a third AND circuit for performing an AND operation of outputs of the first AND circuit and the second AND circuit.

8. The phase monitor according to claim 7, comprising:
a filter for averaging outputs of the third AND circuit.

9. A control device using the phase monitor according to claim 4, comprising:
a control unit for shifting, by $\pi/4$, amounts of phase of the two interferometers of the first branch pair or of the two interferometers of the second branch pair when it is determined that the signals of the first branch pair and the signals of the second branch pair are in a relationship in which the signals in each pair are equal to each other or one signal is a signal whose sign is inverted sign of the other signal in each pair.

* * * * *